United States Patent
Hsieh

(10) Patent No.: US 10,569,395 B2
(45) Date of Patent: Feb. 25, 2020

(54) CONNECTION STRUCTURE CONNECTED BETWEEN WRENCH HEAD OF TORQUE WRENCH AND SOCKET

(71) Applicant: Wei-Ning Hsieh, Taichung (TW)

(72) Inventor: Wei-Ning Hsieh, Taichung (TW)

( * ) Notice: Subject to any disclaimer, the term of this patent is extended or adjusted under 35 U.S.C. 154(b) by 193 days.

(21) Appl. No.: 15/640,372

(22) Filed: Jun. 30, 2017

(65) Prior Publication Data

US 2019/0001470 A1   Jan. 3, 2019

(51) Int. Cl.
*B25B 23/00* (2006.01)
*B25B 23/142* (2006.01)
*B60C 25/00* (2006.01)

(52) U.S. Cl.
CPC ...... *B25B 23/0007* (2013.01); *B25B 23/1425* (2013.01); *B60C 25/002* (2013.01)

(58) Field of Classification Search
CPC . B25B 23/1422; B25B 23/1425; B25B 23/14; B25B 23/0007; B60C 25/002
See application file for complete search history.

(56) References Cited

U.S. PATENT DOCUMENTS

| | | | | |
|---|---|---|---|---|
| 4,162,639 A * | 7/1979 | Gill | ......................... | B25B 23/14 81/429 |
| 5,537,877 A * | 7/1996 | Hsu | ..................... | B25B 23/1425 73/862.23 |
| 7,313,990 B1 * | 1/2008 | Shiao | ................... | B25B 23/1425 81/479 |
| 2002/0098938 A1 * | 7/2002 | Milbourne | ............. | B23Q 5/142 475/286 |
| 2004/0211576 A1 * | 10/2004 | Milbourne | ............ | B23B 45/008 173/48 |
| 2006/0201688 A1 * | 9/2006 | Jenner | ..................... | B25B 21/00 173/48 |
| 2007/0051186 A1 * | 3/2007 | Gharib | ................ | B25B 23/1425 73/862.21 |
| 2011/0107882 A1 * | 5/2011 | Chen | ................... | B25B 23/1425 81/479 |
| 2011/0283845 A1 * | 11/2011 | Huang | ................ | B25B 23/0021 81/479 |
| 2012/0090863 A1 * | 4/2012 | Puzio | ...................... | B25B 21/02 173/2 |
| 2016/0288304 A1 * | 10/2016 | Shiao | .................. | B25B 23/0028 |

* cited by examiner

*Primary Examiner* — Monica S Carter
*Assistant Examiner* — Marcel T Dion

(57) ABSTRACT

A connection structure is connected between a wrench head of a torque wrench and a socket, and the connection structure contains: a body, a casing, and two positioning members. The body includes a coupling section, a driving section, an extension defined between the coupling section and the driving section, and two bolts oppositely inserted into the body from an outer wall of the coupling section. The casing includes a first part, a second part, and two accommodation grooves respectively defined on two inner walls of the first part and the second part and located adjacent to the coupling section. Each of the two positioning members is housed in each of the two accommodation grooves, wherein each positioning member includes multiple toothed projections arranged on an inner wall thereof and abutting against each of the two bolts.

3 Claims, 3 Drawing Sheets

CONNECTION STRUCTURE CONNECTED BETWEEN WRENCH HEAD OF TORQUE WRENCH AND SOCKET

FIELD OF THE INVENTION

The present invention relates to a connection structure in which the casing is rotated relative to the body so as to adjust a viewing angle of the torque display unit after operating the torque wrench, and the user views the torque value of the operation torque exactly and quickly.

BACKGROUND OF THE INVENTION

A conventional torque wrench is employed to screw a bolt with a nut or to unscrew the bolt from the nut. To display a torque value of an operation torque, a digital torque wrench has been developed so that a user views the torque value.

A conventional digital torque wrench is disclosed in TW Patent No. M392714 and contains: a body, a sensing element, and a digital display unit.

The body includes a first part and a second part, wherein the first part has a first coupling section configured to fit with a workpiece, and the first part also has a second coupling section. The second part has a third coupling section configured to fit with a torque tool, and the second part also has a fourth coupling section removably connecting with the second coupling section of the first part. The sensing element is disposed on an outer wall of the body so as to sense the operation torque on the body and to send a signal. The digital display unit is electrically connected with the sensing element so as to receive the signal from the sensing element and to display the torque value converted from the signal.

However, the digital display unit is mounted on the body, so when the body is rotated, the digital display unit rotates as well, hence the user has to move his/her body to view the torque value.

The present invention has arisen to mitigate and/or obviate the afore-described disadvantages.

SUMMARY OF THE INVENTION

The primary objective of the present invention is to provide a connection structure in which the casing is rotated relative to the body so as to adjust a viewing angle of the torque display unit after operating the torque wrench, and the user views the torque value of the operation torque exactly and quickly.

To obtain the above mentioned objective, a connection structure provided by the present invention is connected between a wrench head of a torque wrench and a socket, and the connection structure contains: a body, a casing, and two positioning members.

The body includes a coupling section configured to connect with a torque wrench, a driving section configured to connect with a socket, an extension defined between the coupling section and the driving section, and two bolts oppositely inserted into the body from an outer wall of the coupling section.

The casing includes a first part and a second part which are connected together and cover the body, and the casing is rotatably fitted onto the extension of the body. The casing also includes two accommodation grooves respectively defined on two inner walls of the first part and the second part and located adjacent to the coupling section.

Each of the two positioning members is arcuate and is made of plastic material, and each positioning member is housed in each of the two accommodation grooves, wherein each positioning member includes multiple toothed projections arranged on an inner wall thereof and abutting against each of the two bolts.

Preferably, each accommodation groove has two locking tabs respectively arranged on two ends thereof, and each positioning member further includes two hooking portions individually formed on two ends thereof so as to hook with the two locking tabs of each accommodation groove respectively.

Preferably, the casing further includes a digital display unit configured to display a torque value.

DETAILED DESCRIPTION OF THE PREFERRED EMBODIMENTS

Figure 1:
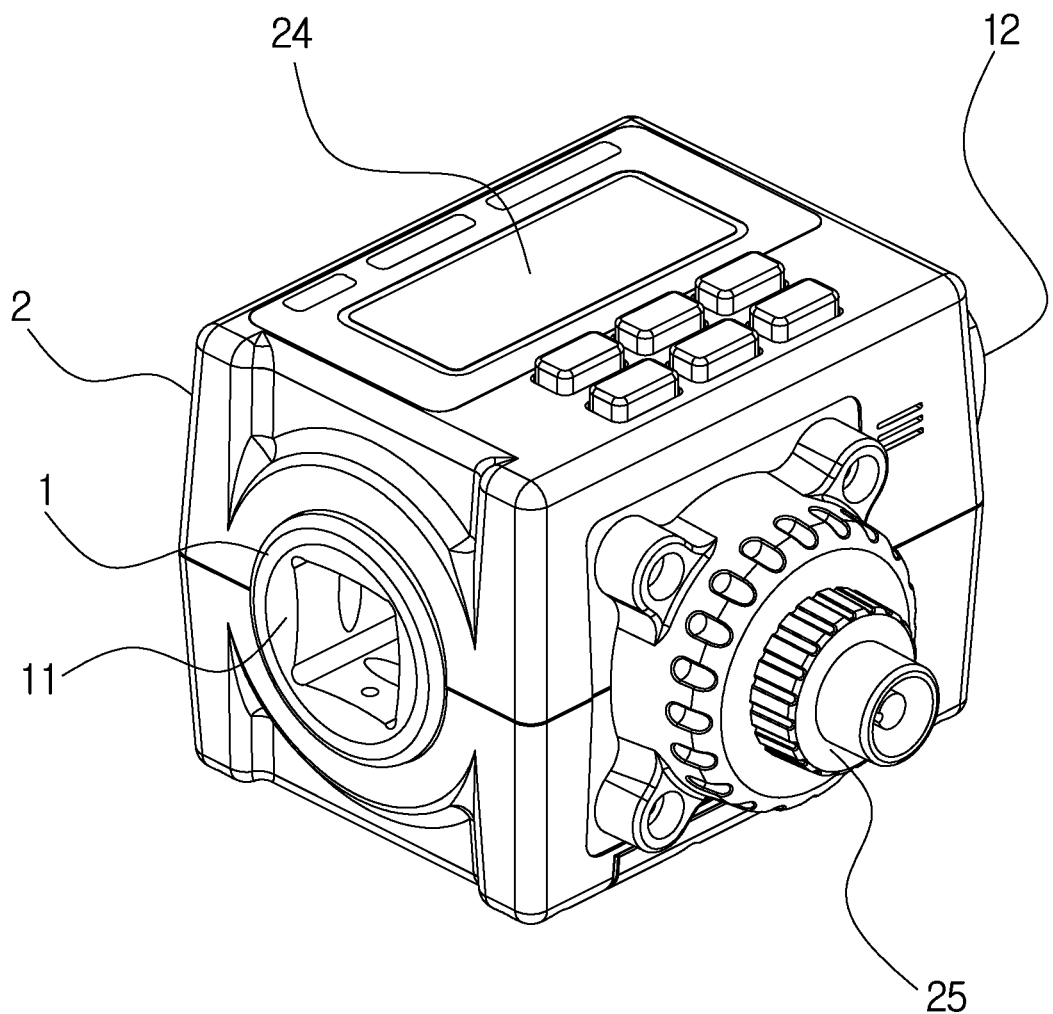
FIG. 1 is a perspective view showing the assembly of a connection structure according to a preferred embodiment of the present invention.
Figure 2:
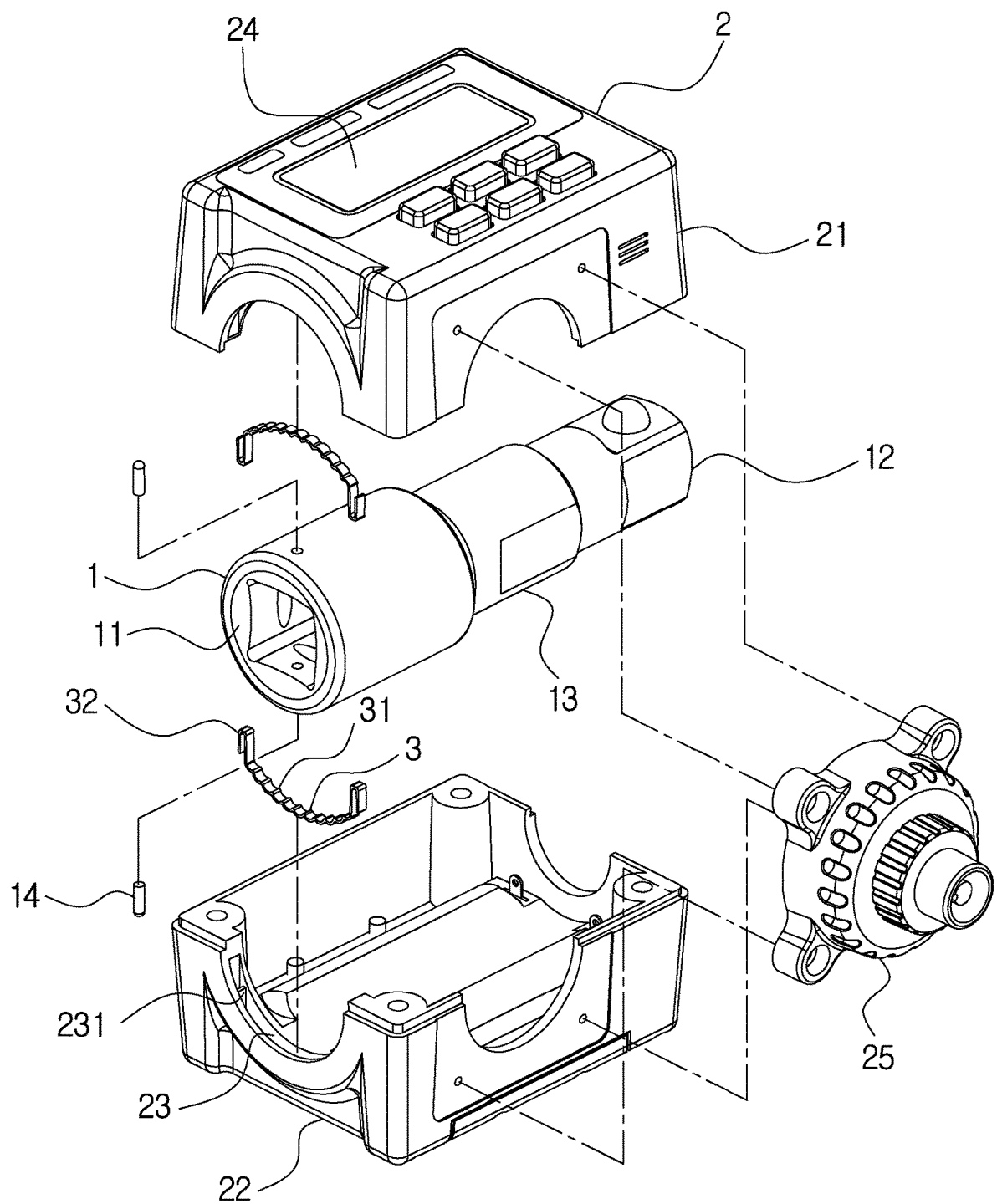
FIG. 2 is a perspective view showing the exploded components of the connection structure according to the preferred embodiment of the present invention.

With reference to FIGS. 1-4, a connection structure according to a preferred embodiment of the present invention is connected between a wrench head of a torque wrench and a socket, and the connection structure comprises: a body 1, a casing 2, and two positioning members 3.

The body 1 includes a coupling section 11 configured to connect with a torque wrench, a driving section 12 configured to connect with a socket, an extension 13 defined between the coupling section 11 and the driving section 12, and two bolts 14 oppositely inserted into the body 1 from an outer wall of the coupling section 11.

The casing 2 includes a first part 21 and a second part 22 which are connected together and cover the body 1, and the casing 2 is rotatably fitted onto the extension 13 of the body 1. The casing 12 also includes two accommodation grooves 23 respectively defined on two inner walls of the first part 21 and the second part 22 and located adjacent to the coupling section 11. The casing 2 further includes a digital display unit 24 configured to display a torque value.

Each of the two positioning members 3 is arcuate and is made of plastic material, and each positioning member 3 is housed in each of the two accommodation grooves 23. Each positioning member 3 includes multiple toothed projections 31 arranged on an inner wall thereof and abutting against each of the two bolts 14.

A strain gauge and an electric circuit, which are configured to detect an operation torque, are not shown in FIGS. 1-4, and their further remarks are omitted due to the torque wrench is a well-known prior art.

Figure 3:
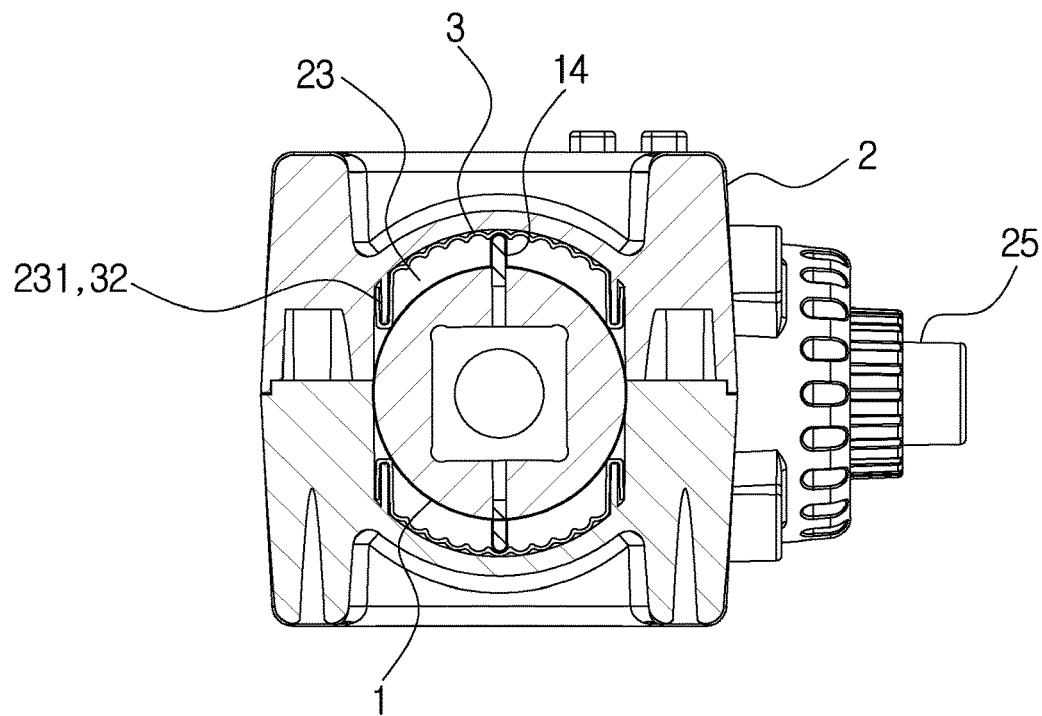
FIG. 3 is a cross sectional view showing the operation of the connection structure according to the preferred embodiment of the present invention.
Figure 4:
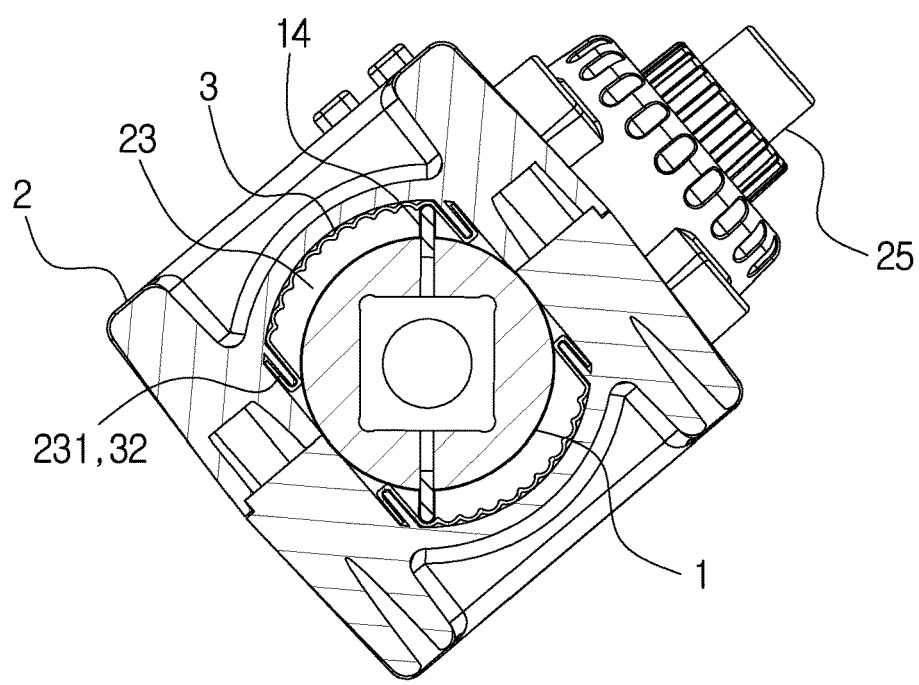
FIG. 4 is another cross sectional view showing the operation of the connection structure according to the preferred embodiment of the present invention.

The casing 2 is rotated relative to the body 1 so as to judge the torque value, when the body 1 revolves. As illustrated in FIGS. 3 and 4, each bolt 14 moves among the multiple toothed projections 31 and abuts against one of the multiple toothed projections 31, after the casing 2 stops rotation.

Each accommodation groove 23 has two locking tabs 231 respectively arranged on two ends thereof, and each positioning member 3 further includes two hooking portions 32 individually formed on two ends thereof so as to hook with the two locking tabs 231 of each accommodation groove 23 respectively, such that each positioning member 3 is mounted in each accommodation groove 23 securely, when the casing 2 is rotated.

The casing 2 further includes a tire pressure detector 25 fixed on one side of the casing 2 so that the tire pressure detector 25 measures a tire pressure, after replacing a tire.

Accordingly, the casing is rotated relative to the body so as to adjust a viewing angle of the torque display unit after operating the torque wrench, and the user views the torque value of the operation torque exactly and quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A connection structure for connection between a wrench head of a torque wrench and a socket, the connection structure comprising: a body, a casing, and two positioning members; wherein:
   the body includes a coupling section configured to connect with a torque wrench, a driving section configured to connect with a socket, an extension defined between the coupling section and the driving section, and two bolts oppositely inserted into the body from an outer wall of the coupling section;
   the casing includes a first part and a second part which are connected together and cover the body, the casing being rotatably coupled with the extension of the body the casing also including two accommodation grooves respectively defined on two inner walls of the first part and the second part and located adjacent to the coupling section;
   each of the two positioning members is arcuate and made of a plastic material, each positioning member being respectively housed in one of the two accommodation grooves, each positioning member including multiple toothed projections arranged on an inner wall thereof and abutting against a respective one of the two bolts; and
   each accommodation groove has two locking tabs respectively arranged on two ends thereof, and each positioning member further includes two hooking portions individually formed on two ends thereof so as to immovably hook with the two locking tabs of each accommodation groove respectively.

2. The connection structure as claimed in claim 1, wherein the casing further includes a digital display unit configured to display a torque value.

3. The connection structure as claimed in claim 1, wherein the casing further includes a tire pressure detector.

* * * * *